United States Patent [19]
Chakrabarti et al.

[11] Patent Number: 5,885,479
[45] Date of Patent: Mar. 23, 1999

[54] PRODUCTION OF FLAME-RESISTANT FLEXIBLE POLYURETHANE FOAMS

[75] Inventors: Sarbananda Chakrabarti, Mannheim; Stefan Fox, Mettlach; Jürgen Schneider, Freinsheim; Klaus Schmutzer, Odelzhausen, all of Germany

[73] Assignee: BASF Aktiengesellschaft, Ludwigshafen, Germany

[21] Appl. No.: 847,208

[22] Filed: May 1, 1997

Related U.S. Application Data

[62] Division of Ser. No. 705,100, Aug. 28, 1996, Pat. No. 5,741,827.

[51] Int. Cl.$^6$ .......................... C08K 5/3492; C08K 5/41; C08K 5/42
[52] U.S. Cl. .................. 252/182.24; 252/182.27; 252/182.29; 252/142; 252/315.01; 252/315.4; 252/550; 252/554; 252/558
[58] Field of Search ................ 252/182.24, 182.27, 252/182.29, 315.4, 315.01, 142, 550, 554, 558

[56] References Cited

U.S. PATENT DOCUMENTS

| | | | |
|---|---|---|---|
| 4,221,875 | 9/1980 | Yukuta et al. | 521/128 |
| 4,258,141 | 3/1981 | Jarre et al. | 521/114 |
| 4,293,657 | 10/1981 | Nissen et al. | 521/121 |
| 4,745,133 | 5/1988 | Grinbergs et al. | 521/128 |
| 5,087,384 | 2/1992 | Horacek et al. | 252/182.14 |
| 5,106,883 | 4/1992 | Horacek | 521/105 |
| 5,183,830 | 2/1993 | Mohring et al. | 521/107 |
| 5,516,337 | 5/1996 | Nguyen | 8/557 |
| 5,520,781 | 5/1996 | Curham et al. | 162/199 |
| 5,741,827 | 4/1998 | Chakrabarti et al. | 521/121 |

FOREIGN PATENT DOCUMENTS

| | | |
|---|---|---|
| 0 637 617A2 | 2/1985 | European Pat. Off. . |
| 0 377 891A2 | 12/1989 | European Pat. Off. . |
| 0 377868A2 | 12/1989 | European Pat. Off. . |
| 0 492139A1 | 11/1991 | European Pat. Off. . |
| 0 482507A2 | 4/1992 | European Pat. Off. . |
| 02236612 | 4/1992 | European Pat. Off. . |
| A-2348 838 | 9/1973 | Germany . |
| 2932304 | 8/1979 | Germany . |
| 2 177 405 | 6/1985 | United Kingdom . |
| 2 163 762 | 8/1994 | United Kingdom . |

*Primary Examiner*—Rabon Sergent
*Attorney, Agent, or Firm*—Fernando A. Borrego

[57] ABSTRACT

Flame-resistant flexible polyurethane foams are produced by reacting
   a) organic and/or modified organic polyisocyanates,
   b) relatively high molecular weight compounds containing at least two reactive hydrogen atoms and
   c) if desired, low molecular weight chain extenders
in the presence of
   d) catalysts,
   e) blowing agents
   f) flame retardants,
and, if desired
   g) auxiliaries and/or additives,
   where the flame retardants f) used are melamine in combination with at least one anionic dispersant.

29 Claims, No Drawings

PRODUCTION OF FLAME-RESISTANT FLEXIBLE POLYURETHANE FOAMS

This is a divisional application Ser. No. 08/705,100 filed Aug. 28, 1996, now U.S. Pat. No. 5,741,827.

The production of elastic flexible polyurethane (PU) foams is known and is described in many patent and literature publications. Examples which may be mentioned are the Kunststoff-Hand-buch, Volume VII, Polyurethane, Carl Hanser Verlag, Munich, 1st edition, 1966, edited by Dr. R. Vieweg and Dr. A. Höchtlen, and 2nd edition, 1983, edited by Dr. G. Oertel, and also the monograph "Integralschaumstoffe" by Dr. H. Piechota and Dr. H. Röhr, 1975, published by the same publisher.

Flexible PU foams are usually produced using commercial tolylene diisocyanates as polyisocyanates, polyoxyalkylene polyols based on 1,2-propylene oxide and/or ethylene oxide and also mixtures of such polyoxyalkylene polyols and graft polyoxyalkylene polyols as polyfunctional relatively high molecular weight compounds and an alkanediol or hydroxyl—and/or amino-containing compounds having a functionality greater than 2, for example glycerol, trimethylolpropane or alkanolamines, as chain extenders.

Such flexible PU foams are not flame resistant; a particular disadvantage is their ready flammability. To reduce this disadvantage, flame retardants, preferably halogen- and/or phosphorus-containing compounds, are incorporated into the foamable PU mixtures. However, the addition of these products frequently has an adverse effect on the mechanical properties of the PU foams obtained. There have therefore been many attempts to develop new flame retardants and to use these to completely or at least partially replace the halogen— and/or phosphorus-containing compounds in PU foams.

A compound mentioned as suitable for this purpose is, for example, melamine which melts at 354° C. and is polyfunctional. According to DE-A-23 48 838, the melamine is suspended in the polyol and/or the polyisocyanate component and the suspension obtained is immediately processed into flameproof PU plastics containing isocyanurate groups. Nonflammable rigid PU foams are obtained, according to U.S. Pat. No. 4,221,875 (DE-A-28 09 084) by reacting organic polyisocyanates and polyoxyalkylene polyols in the presence of blowing agents and silicones as surface-active additive plus from 20 to 100 parts by weight of melamine as flame retardant per 100 parts by weight of polyoxyalkylene polyol.

EP-A-0 004 618 (U.S. Pat. No. 4,258,141) describes a process for producing flame-resistant flexible PU foams using a mixture of diphenylmethane diisocyanates and polyphenylpolymethylene polyisocyanates (raw MDI) having a diphenylmethane diisocyanate isomer content of from 40 to 90% by weight, based on the total weight,-as polyisocyanates and using cyanuric acid derivatives, in particular melamine, as flame retardant.

Although the flame resistance of the PU foams was able to be significantly improved by means of these processes, the strong sedimentation of the melamine in the polyol, which occurs after only a short period of storage, has to be regarded as a disadvantage in these processes as well. To overcome this disadvantage, EP-B-023 987 (U.S. Pat. No. 4,293,657) describes stable melamine-polyol dispersions in which the melamine is comminuted in situ in the polyol in the presence of at least one stabilizer at a local energy density of from 10 to 3000 kW/m$^3$ to a particle size of less than 10 μm. This additional process measure requires a high outlay in terms of apparatus and is costly.

In addition, attempts have been made to improve the processibility of melamine-containing PU formulations by means of suitable additives, without reducing the flame resistance of the foams concerned. According to DE-A-35 30 519 (GB-A-21 63 762A), a mixture of melamine and an addition product of alkanolamine and isocyanate which is dispersed in a polyol, is used as flameinhibiting additive. GB-A-21 77 405A and 2177 405A describe mixtures of melamine and styrene-acrylonitrile-graft-polyoxypropylene-polyoxyethylene polyols, dispersed in customary polyoxypropylene-polyoxyethylene polyols, and also, if desired, phosphorus- and/or halogen-containing compounds, as flame-retardant additive. Although foams produced by these processes have good flame resistance, their mechanical properties often do not meet requirements. Another disadvantage is that the formulations have to be processed in multicomponent mixers, since the melamine-containing component is not sufficiently storage stable.

EP-B-439 719 describes stable melamine preparations comprising melamine, cyanuric acid, chlorides or bromides of cyanuric acid or of isocyanuric acid, ammelin (2,4-diamino-6-hydroxy-1,3,5-triazine) or ammelid (2-amino-4,6-dihydroxy-1,3,5-triazine).

EP-A-391 116 describes dispersions comprising melaine and substituted or unsubstituted urea, thiourea or biuret in polyetherols.

EP-A-492 139 describes microcapsules comprising melamine encapsulated in plastic for making plastics flame resistant.

EP-A-377 868 proposes specific polyol combinations for stabilizing melamine-containing polyol components.

EP-A-377 891 describes melamine-polyetherpolyol dispersions comprising melamine, 1,6-hexanediol and/or trimethylolpropane and at least one polyether polyol, while EP-A-482 507 describes melamine-expanded graphite-polyether polyol dispersions.

The processes described in the prior art have in common the fact that some of the dispersants described therein have an adverse effect on the foam properties and that satisfactory dispersion stability is not achieved in every case.

It is an object of the present invention to develop a process for producing flameproof flexible polyurethane foams, in which melamine is used as flame retardant and the melamine is present as a stable dispersion in the polyol component, without the manner of dispersion resulting in disadvantages in processing and the foam properties.

We have found that this object is achieved by the melamine being present in the polyol component together with at least one anionic dispersant.

In a preferred embodiment of the invention, at least one organic acid and/or at least one ester of an organic acid is added in addition to the anionic dispersant.

The invention accordingly provides a process for producing flame-resistant flexible polyurethane foams by reacting a) organic and/or modified organic polyisocyanates, b) relatively high molecular weight compounds containing at least two reactive hydrogen atoms and c) if desired, low molecular weight chain extenders in the presence of d) catalysts, e) blowing agents f) flame retardants, and, if desired g) auxiliaries and/or additives, wherein the flame retardants f) used are melamine in combination with at least one anionic dispersant.

The melamine used according to the present invention as flame retardant can be used in commercial form. These products usually have the following particle size distribution:

10% by weight of the particles are larger than 30 μm
30% by weight of the particles are larger than 24 μm
50% by weight of the particles are larger than 20 μm
70% by weight of the particles are larger than 16 μm
90% by weight of the particles are larger than 11 μm.

Melamine having an average particle size of from 20 to 50 μm and a bulk density of from 300 to 800 g/l, in particular from 500 to 650 g/l, has been found to be particularly useful and is therefore preferably used. The melamine is advantageously used in an amount of from 5 to 50% by weight, in particular from 10 to 40% by weight and particularly preferably from 10 to 20% by weight, based on the component b).

Conveniently, only melamine is used as flame retardant. However, it can also be advantageous, to achieve specific effects such as homogenization and stabilization of the starting component mixtures, reduction of smoke formation in case of fire, targeted improvement of mechanical properties of the PU foams produced, etc., to combine the melamine with other customary organic or inorganic flame retardants, for example with starch, advantageously selected from the group of maize, rice, potato or wheat starch or mixtures thereof and also, if desired, chemically modified starch derivatives, and/or flame retardants from the group tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, aluminum oxide hydrate, ammonium sulfate, the ammonium phosphates and ammonium polyphosphates.

Anionic dispersants used are, in particular, those having at least one sulfonate or sulfate group in the molecule.

Particularly suitable dispersants are (diphenyl oxide)-disulfonates containing linear or branched $C_6$–$C_{16}$-alkyl radicals as are supplied under the name Dowfax® by Dow Chemical Co.

Further particularly suitable compounds are sulfated alkylphenyl ethoxylates or their alkali metal salts. Very suitable compounds are octylphenolethyl sulfate and its sodium salt, which is supplied under the name Emulphor® OPS 25 by BASF AG.

In a particularly advantageous embodiment of the invention, at least one organic acid and/or ester thereof, in particular alkyl ester, is additionally added.

Particularly suitable compounds of this type are dibasic or tribasic carboxylic acids or their esters, particularly those selected from the group consisting of malonic acid, oxalic acid, lactic acid and their $C_1$–$C_4$-alkyl esters.

The anionic dispersants are used in an amount of from 0.1 to 2% by weight, preferably from 0.5 to 2% by weight, in particular from 0.5 to 1% by weight, in each case based on b) to g).

The organic acid and/or esters are used in an amount of from 0.001 to 0.1% by weight, in particular from 0.03 to 0.07% by weight, based on b) to g).

If the concentration of the anionic dispersant is too low, the melamine settles prematurely; if the content is too high, it can lead to disturbance of the foam structure, in particular to an undesired closed cell content.

If the organic acid content is too high, it can interfere with the catalysis.

Particularly stable melamine-containing polyol components are obtained when from 10 to 20% by weight of melamine, from 0.3 to 0.6% by weight each of a (diphenyl oxide)-disulfonate containing a $C_6$–$C_{16}$-alkyl radical and of a sulfated alkylphenyl ethoxylate and from 0.03 to 0.06% by weight of an organic acid and/or an ester of an organic acid, in each case based on b), are present in b).

Particularly in the case of water-containing polyol components, an addition of acid and/or ester should be used. In the combinations of melamine, the anionic dispersants and possibly organic acids and/or esters used according to the present invention, only very little settling of the melamine occurs in the polyol component. The polyol component was able to be stored without settling of melamine for up to one month.

The otherwise necessary stirring up of the polyol component prior to processing was not required, and no settling of melamine occurred in the drums and machine containers.

Surprisingly, no disadvantages at all occurred in the foam properties of the flexible foams produced by the process of the present invention. On the contrary, the moldings thus produced had an improved foam surface, a homogeneous dense distribution in the cushion and improved demoldability. The requirements of the flame test in accordance with DIN 5510, Part 2, were met.

The flexible polyurethane foams produced according to the present invention are preferably used for seat cushions in vehicle interiors.

The following may be said about the starting components which can be used for the process of the present invention:

a) Suitable polyisocyanates for producing the flame-resistant, elastic flexible PU foams, preferably the molded flexible PU foams are the known organic, eg. aliphatic, cycloaliphatic, araliphatic, cycloaliphatic-aromatic and preferably aromatic, di- and/or polyisocyanates. Specific examples of aromatic polyisocyanates are: mixtures of MDI isomers and polyphenol-polymethylene polyisocyanates, known as raw MDI, having an MDI isomer content of at least 50% by weight, preferably from 60 to 90% by weight and more, based on the total weight of the mixture, tolylene 2,4- and 2,6-diisocyanate and also the corresponding commercial isomer mixtures, mixtures of tolylene diisocyanates and MDI and/or raw MDI, for example those having an MDI content of from 30 to 90% by weight, preferably from 40 to 80% by weight, based on the total weight of the raw MDI.

Also suitable are modified polyfunctional isocyanates, ie. products which are obtained by chemical reaction of organic di- and/or polyisocyanates. Examples which may be mentioned are di- and/or polyisocyanates containing ester, urea, biuret, allophanate, isocyanurate and preferably carbodiimide, uretonimine and/or urethane groups. Specific examples are: prepolymers containing urethane groups and having an NCO content of from 14 to 2.8% by weight, preferably from 12 to 3.5% by weight, or pseudoprepolymers having an NCO content of from 35 to 14% by weight, preferably from 34 to 22% by weight, where polyisocyanates modified with urethane groups and formed from tolylene diisocyanates have, in particular, an NCO content of from 34 to 28% by weight and those from 4,4'-MDI, 4,4'- and 2,4'-MDI isomer mixtures or raw MDI have, in particular, an NCO content of from 28 to 22% by weight, based on the total weight, and are prepared by reacting diols, oxyalkylene glycols and/or polyoxyalkylene glycols having molecular weights of from 62 to 6000, preferably from 134.18 to 4200, with tolylene diisocyanates, 4,4'-MDI, MDI isomer mixtures and/or raw MDI at, for example, from 20 to 110° C., preferably from 50° to 90° C., with examples of oxyalkylene and polyoxyalkylene glycols, which can be used individually or as a mixture, being: diethylene, dipropylene, polyoxyethylene, polyoxypropylene and polyoxypropylene-polyoxyethylene glycols, polyisocyanates, eg. those based on MDI isomers and/or tolylene diisocyanates, containing carbodiimide groups and/or isocyanurate groups.

However, isocyanates which have been found to be particularly useful and are therefore preferably used are tolylene 2,4-diisocyanate, tolylene 2,6-diisocyanate, mixtures of tolylene 2,4- and 2,6-diisocyanate and polyisocyanates containing urethane groups and having an NCO content of from 34 to 28% by weight, particularly preferably from 34 to 30% by weight, prepared from tolylene 2,4- and 2,6-diisocyanate mixtures, advantageously in a weight ratio of 80:20, and polyoxypropylene-polyoxyethylene glycols having a molecular weight of from 2800 to 4200.

b) Suitable relatively high molecular weight compounds containing reactive hydrogen atoms (b) are those having an average functionality of from 2 to 4 and an average molecular weight of from 2200 to 8000.

Polyoxyalkylene polyols having an average functionality of from 2 to 4, in particular from 2.0 to 2.4, and an average molecular weight of from 250 to 8000, in particular from 3600 to 6500, suitable for this purpose can be prepared by known methods, for example by anionic polymerization using alkali metal hydroxides such as sodium or potassium hydroxide, or alkali metal alkoxides such as sodium methoxide, sodium or potassium ethoxide or potassium isopropoxide as catalysts or by cationic polymerization using Lewis acids such as antimony pentachloride, boron trifluoride etherate, etc., or bleaching earth as catalysts, from one or more alkylene oxides having from 2 to 4 carbon atoms in the alkylene radical and an initiator molecule containing from 2 to 4, preferably 2 or 3, reactive hydrogen atoms in bonded form.

Suitable alkylene oxides are, for example, tetrahydrofuran, 1,3-propylene oxide, 1,2- or 2,3-butylene oxide and preferably ethylene oxide and 1,2-propylene oxide. The alkylene oxides can be used individually, alternately in succession or as mixtures. Examples of suitable initiator molecules are: water, organic dicarboxylic acids such as succinic acid, adipic acid, phthalic acid and terephthalic acid, aliphatic and aromatic, unalkylated or N-monoalkylated or N,N- or N,N'-dialkylated diamines having from 1 to 4 carbon atoms in the alkyl radical, for example unalkylated, monoalkylated or dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,4- and 2,6-tolylenediamine and 4,4'-, 2,4'- and 2,2'-diaminodiphenylmethane.

Other suitable initiator molecules are: alkanolamines such as ethanolamine, diethanolamine, N-methylethanolamine and N-ethylethanolamine, N-methyldiethanolamine and N-ethyldiethanolamine and triethanolamine, and ammonia. Preference is given to using polybasic, in particular dibasic and/or tribasic alcohols, for example ethanediol, 1,2- and 1,3-pro-panediol, diethylene glycol, dipropylene glycol, 1,4-butanediol, 1,6-hexanediol, glycerol, trimethylolpropane and pentaerythritol.

The polyoxyalkylene polyols can be used individually or in the form of mixtures, with preference being given to those products containing both ethylene oxide and 1,2-propylene oxide units in bonded form in the oxyalkylene chain, with these being able to be arranged either randomly or blockwise. In particular, use is made of polyoxypropylene-polyoxyethylene polyols having more than 50% of terminal primary hydroxyl groups, a functionality of from 2 to 3 and a molecular weight of from 3600 to 6500, polyoxytetramethylene glycols, advantageously those having molecular weights of from 250 to 3000, preferably from 800 to 2200, or mixtures of the specified polyols.

Polymer-modified polyoxyalkylene polyols, known as polymer polyols, having an average functionality of preferably from 2 to 4, in particular from 2 to 3, and an average molecular weight of preferably from 1200 to 8000, in particular from p 2200 to 6500, which are preferably used are graft polyoxyalkylene polyols. These can be prepared by in situ polymerization of olefinically unsaturated monomers or mixtures such as styrene, acrylonitrile or preferably styrene/acrylonitrile mixtures, in polyoxyalkylene polyols, eg. the above-described polyoxyalkylene polyols, using a method similar to that given in the German Patents Nos. 11 11 394, 12 22 669 (U.S. Pat. Nos. 3,304,273, 3,383,351, 3,523,093), 11 52 536 (GB 1 040 452) and 11 52 537 (GB 987 658) or by dispersing graft polymers, which have previously been prepared by free-radical polymerization in solvents, in polyoxyalkylene polyols using a method similar to that given in the U.S. Pat. Nos. 3,391,092, 4,014,846, 4,093,573. The graft polyoxyalkylene polyols can be prepared either from the abovementioned saturated polyoxyalkylene polyols which, according to U.S. Reissue Pat. No. 28,715, are essentially free of ethylenically unsaturated units or from olefinically unsaturated polyoxyalkylene polyols as are described, for example, in U.S. Pat. No. 3,652,659 and in U.S. Reissue Pat. No. 29,014. Further suitable polymer-modified polyoxyalkylene polyols are dispersions of polyurethane-polyoxyalkylene polyols containing bonded polyurea, polyhydrazide or tert-amino groups as are described, for example, in EP-B-0 011 752 (U.S. Pat. No. 4,304,708), U.S. Pat. No. 4,374,209 and DE-A-32 31 497. The polymer-modified polyoxyalkylene polyols, which advantageously contain from 2 to 35% by weight, preferably from 3 to 25% by weight, based on the total weight, of polymer particles, can, like the polyoxyalkylene polyols and the polyoxyalkylenepolyamines, be used individually or in the form of mixtures.

Suitable polyoxyalkylenepolyamines preferably having an average functionality of from 2 to 4, in particular from 2 to 3, and an average molecular weight of preferably from 1800 to 8000, in particular from 2500 to 6500, are advantageously those whose amino groups are bonded to aliphatic radicals and which comprise at least 70%, preferably more than 90%, of primary amino groups.

The polyoxyalkylenepolyamines containing amino groups bonded to aliphatic radicals which are preferably used according to the present invention can be prepared by known methods, for example by cyanoalkylation of the polyoxyalkylene polyols described and subsequent hydrogenation of the nitrile formed (U.S. Pat. No. 3,257,050) or by amination of polyoxyalkylene polyols with ammonia in the presence of hydrogen and catalysts (DE-A-12 15 373).

C) To modify the mechanical properties of the flame-resistant, elastic flexible PU foams, in particular molded flexible foams, it may be advantageous to use a low molecular weight chain extender (c) in addition to the component (b) in the production. Suitable agents of this type are polyfunctional, in particular difunctional and trifunctional, compounds having molecular weights of from 17 to about 400, preferably from 62 to about 300. Use is made, for example, of dialkanolamines and/or trialkanolamines such as diethanolamine and triethanolamine, aliphatic diols and/or triols having from 2 to 6 carbon atoms in the alkylene radical, for example ethanediol, 1,4-butanediol, 1,5-pentanediol, 1,6-hexanediol, glycerol and/or trimethylolpropane, and low molecular weight ethoxylation and/or propoxylation products prepared from the above dialkanolamines, trialkanolamines, diols and/or triols or aliphatic and/or aromatic diamines such as 1,2-ethanediamine, 1,4-butanediamine, 1,6-hexanediamine, 2,4- and/or 2,6-tolylenediamine, 4,4'-diaminodiphenylmethanes as initiator molecules and alkylene oxide or alkylene oxide mixtures.

Chain extenders (c) which are preferably used are dialkanolamines, diols and/or triols and, in particular, 1,6-hexanediol, diethanolamine, trimethylolpropane and glycerol or mixtures thereof.

The chain extenders which are preferably concomitantly used for producing the flexible PU foams are advantageously used in such amounts that from 0.01 to 8 mol, in particular from 0.1 to 3 mol, of chain extender (c) per mole of relatively high molecular weight compound (b) are present in the reaction mixture.

d) To accelerate the reaction between the component (b), water as blowing agent (e) and, if used, chain extender (c) and the organic polyisocyanates and/or modified polyisocyanates (a), customary polyurethane catalysts are incorporated into the reaction mixture. Preference is given to using basic polyurethane catalysts, for example tertiary amines such as dimethylbenzylamine, dicyclohexylmethylamine, dimethylcyclohexylamine, bis(N,N-dimethylaminoethyl) ether, bis(dimethylaminopropyl)urea, N-methylmorpholine or N-ethylmorpholine, di-methylpiperazine, N-dimethylaminoethylpiperidine, 1,2-dimethylimidazole, l-azabicyclo[2.2.0]octane, dimethylaminoethanol, 2-(N,N-dimethylaminoethoxy)ethanol, N,N', N"-tris (dialkylaminoalkyl)hexahydrotriazines, eg. N,N', N"-tris (dimethylaminopropyl)-s-hexahydrotriazine and, in particular, triethylenediamine. However, metal salts such as iron(II) chloride, zinc chloride, lead octoate and preferably tin salts such as tin dioctoate, tin di(ethylhexanoate) and dibutyltin dilaurate, and in particular mixtures of tertiary amines and organic tin salts are also suitable. Use is advantageously made of from 0.1 to 10% by weight, preferably from 0.3 to 3% by weight, of catalyst based on tertiary amine and/or from 0.01 to 0.5% by weight, preferably from 0.03 to 0.25% by weight, of metal salts, based on the weight of the component (b).

e) Blowing agents (e) which can be used for producing the flexible PU foams preferably include water which reacts with isocyanate groups to form carbon dioxide. The amounts of water which are advantageously used are from 0.1 to 5 parts by weight, preferably from 1.0 to 3.5 parts by weight and in particular from 2.5 to 3.0 parts by weight, based on 100 parts by weight of the component (b).

It is also possible to use physically acting blowing agents in admixture with water. Suitable physically acting blowing agents are liquids which are inert toward the organic, modified or unmodified polyisocyanates (a) and have boiling points below 100° C., preferably below 50° C., in particular from −50° C. to 30° C., at atmospheric pressure, so that the exothermic polyaddition reaction causes them to vaporize. Examples of such liquids which can be preferably used are hydrocarbons such as pentane, n- and iso-butane and propane, ethers such as dimethyl ether and diethyl ether, ketones such as acetone and methyl ethyl ketone, ethyl acetate and, preferably, halogenated hydrocarbons such as methylene chloride, trichlorofluoromethane, dichlorodifluoromethane, dichloromonofluoro-methane, dichlorotetrafluoroethane and 1,1,2-trichloro-1,2,2-trifluoroethane. It is also possible to use mixtures of these low-boiling liquids with one another and/or with other substituted or unsubstituted hydrocarbons.

The amount of physically acting blowing agents required in addition to water can be determined in a simple manner, depending on the desired foam density, and is about from 0 to 25 parts by weight, preferably from 0 to 15 parts by weight, per 100 parts by weight of the component (b). It may be advantageous to mix the modified or unmodified polyisocyanates (a) with the physically acting blowing agent and thereby reduce the viscosity.

f) Flame retardants used are the above-described compounds, if desired in admixture with other known flame retardants.

g) It is also possible to incorporate auxiliaries and/or additives (g) into the reaction mixture. Examples which may be mentioned are surface-active substances, stabilizers, hydrolysis inhibitors, pore regulators, fungistatic and bacteriostatic substances, dyes, pigments and fillers.

For example, use may be made of surface-active substances which aid homo-genization of the starting materials and may also be suitable for regulating the cell structure of the foams. Examples which may be mentioned are siloxane-oxyalkylene copolymers and other organopolysiloxanes, ethoxylated alkylphenols, ethoxylated fatty alcohols, paraffin oils, castor oil or ricinoleic esters and Turkey red oil, which are used in amounts of from 0.05 to 5 parts by weight, preferably from 0.1 to 2 parts by weight, per 100 parts by weight of the starting component (b).

Further details on the abovementioned other customary auxiliaries and additives can be found in the specialist literature, for example the monograph by J. H. Saunders and K. C. Frisch "High Polymers", Volume XVI, Polyurethanes, Parts 1 and 2, Interscience Publishers, 1962 or 1964 or the Kunststoff-Handbuch, Polyurethane, Volume VII, Hanser-Verlag, Munich, Vienna, 1st and 2nd edition, 1966 and 1983.

To produce the flexible PU foams, the organic, modified or unmodified polyisocyanates (a), the relatively high molecular weight compounds containing at least two reacted hydrogen atoms (b) and, if desired, chain extenders (c) are reactive in the presence of catalysts (d), blowing agents (e), flame retardants (f) and, if desired, auxiliaries and/or additives (g) at from 0° to 100° C., preferably from 15° to 80° C., in such mixing ratios that from 0.5 to 2, preferably from 0.8 to 1.3 and in particular about one, reactive hydrogen atom(s) bonded to the starting components (b) and, if used, (c) are present per NCO group.

The flexible PU foams are advantageously produced by the one-shot process by mixing two components A and B, with the starting components (b), (d), (e), (f) and, if used, (c) and (g) being combined to form the A component and the B component used comprising the starting component (a), if desired in admixture with (f), (g) and inert, physically acting blowing agents. Since the A component has a shelf life of at least 6 months, the A and B components only have to be intensively mixed prior to production of the flexible PU foams. The reaction mixture can be foamed in open or closed molds; it is also suitable for the production of block foams.

As already indicated, the process of the present invention is preferably used for producing flexible PU foams. For this purpose, the reaction mixture is introduced at from 15° to 80° C., preferably from 30° to 65° C., into an advantageously metallic heatable mold. The mold temperature is usually from 20° to 90° C., preferably from 35° to 70° C. The reaction mixture is allowed to cure with compaction, eg. at degrees of compaction of from 1.1 to 8, preferably from 2 to 6 and in particular from 2.2 to 4, in the closed mold.

The flexible PU foams produced by the process of the present invention have densities of from 35 to 120 g/l, preferably from 40 to 80 g/l. They have good flame resistance, passing the Korrosin burner test (FAR 25.853(c)), and have good mechanical properties. The molded foams are preferably used as padding elements, eg. as seat cushions, armrests, headrests, sun visors and safety coverings in vehicle interiors.

The invention is illustrated by the following examples.

EXAMPLES

The additives indicated in the table were metered into a polyol component comprising 61.7 parts by weight of a polyether polyol having a hydroxyl number of 35 mg KOH/g and a molecular weight MW of about 4500, 5.0 parts by weight of a polymer polyol having a hydroxyl number of 28 mg KOH/g and a molecular weight MW of about 4300, 0.2 parts by weight of diethanolamine, 0.2 parts by weight of the silicone stabilizer B 8680 from Goldschmidt, 0.2 parts by weight of the tertiary amine catalyst Dabco 33 LV from Airproducts, 0.5 parts by weight of the acid-blocked amine catalyst Toyocat SF2 from Tosho, 2.2 parts by weight of water, 5.0 parts by weight of trichloropropyl phosphate and 25 parts by weight of melamine, and the mixture was homogenized using a stirrer at about 1300 min$^{-1}$.

Part of the polyol component was taken out immediately thereafter, placed in a closed bottle and the settling behavior was determined. The results are shown in the table.

100 parts by weight of the homogenized polyol component were reacted with 34 parts by weight of a prepolymer formed from a polyether polyol having a functionality of 2 and an OH number of 250 mg KOH/g, dipropylene glycol and diphenylmethane diisocyanate having an NCO content of 28% by weight. The reaction mixture had an initiation time of 9–10 seconds and a rise time of 86–90 seconds.

The foams had a bulk density of about 80 g/l.

The starting materials and results are shown in Table 1.

TABLE 1

| Example | Additive | Conc. [% by wt.]* | Settling behavior in [%]** after (days) | | | | | |
|---|---|---|---|---|---|---|---|---|
| | | | 1 | 3 | 10 | 15 | 20 | 30 |
| 1 (comparison) | none | 0 | 50 | — | — | — | — | — |
| 2 | Emulphor OPS 25 | 0.5–2.0 | 0 | 2 | 8 | | | |
| 3 | Dowfax 3B2 | 0.5 | 0 | 0 | 5 | 8 | 15 | 25 |
| | Emulphor OPS 25 | 0.5 | | | | | | |
| 4 | Dowfax 3B2 | 0.5 | 0 | 0 | 0 | 3 | 5 | 5 |
| | Emulphor OPS 25 | 0.5 | | | | | | |
| | malonic acid | 0.05 | | | | | | |
| 5 | Dowfax 3B2 | 0.5 | 0 | 1 | 13 | 20 | — | — |
| | Emulphor OPS 25 | 0.5 | | | | | | |
| | oxalic acid | 0.05 | | | | | | |

TABLE 1-continued

| Example | Additive | Conc. [% by wt.]* | Settling behavior in [%]** after (days) | | | | | |
|---|---|---|---|---|---|---|---|---|
| | | | 1 | 3 | 10 | 15 | 20 | 30 |
| 6 | Dowfax 3B2 | 0.5 | 0 | 1 | 10 | 15 | — | — |
| | Emulphor OPS 25 | 0.5 | | | | | | |
| | diethyl malonate | 0.05 | | | | | | |

*based on the polyol component
**based on the amount of melamine

The physical properties of the flexible PU foams are shown in table 2.

TABLE 2

| Formulation | Index | Density [g/l] | Tensile strength [kPa] | Elongation [%] | Indentation hardness [N] | Flame test*** |
|---|---|---|---|---|---|---|
| without dispersant (Example 1) | 100 | 65 | 111 | 90 | 490 | passed |
| with dispersant (Example 4) | 100 | 67 | 115 | 92 | 480 | passed |

***Flame test in accordance with DIN 5510, Part 2

We claim:

1. A stable dispersion of melamine in polyol comprising a) compounds containing at least two reactive hydrogen atoms and having a number average molecular weight of from 2200 to 8000, b) melamine, and c) an anionic dispersant selected from the group consisting of (diphenyl oxide)-disulfonates containing a $C_6$–$C_{16}$ alkyl group and mixtures thereof.

2. A stable dispersion as recited in claim 1, further comprising at least one organic carboxylic acid and/or alkyl ester thereof.

3. A stable dispersion as recited in claim 1, further comprising at least one sulfated alkylphenyl ethoxylate and at least one organic carboxylic acid and/or alkyl ester of said organic carboxlic acid.

4. A stable dispersion as recited in claim 1, wherein the anionic dispersant further comprises a sulfated alkylphenyl ethoxylate and/or and alkali metal salt thereof.

5. A stable dispersion as recited in claim 1, wherein the anionic dispersant is selected from the group consisting of mixtures of at least one (diphenyl oxide)-disulfonate containing alkyl groups and at least one sulfated alkylphenyl ethoxylate.

6. A stable dispersion as recited in claim 1, wherein the anionic dispersant is present in an amount of from 0.1 to 2 percent by weight, based on the total weight of the dispersion.

7. A stable dispersion as recited in claim 1, wherein the anionic dispersant is present in an amount of from 0.5 to 2 percent by weight, based on the total weight of the dispersion.

8. A stable dispersion as recited in claim 2, wherein the acid is a dibasic or tribasic acid.

9. A stable dispersion as recited in claim 2, wherein the acid is selected from the group consisting of malonic acid, oxalic acid and lactic acid.

10. A stable dispersion as recited in claim 2, wherein the organic acid and/or ester thereof is present in an amount of from 0.001 to 0.1 percent by weight, based on the total weight of the dispersion.

11. A stable dispersion as recited in claim 2, wherein the organic acid and/or ester thereof is present in an amount of from 0.03 to 0.07 percent by weight, based on the total weight of the dispersion.

12. A stable dispersion as recited in claim 1, wherein melamine is present in an amount of from 5 to 50 percent by weight, based on the component a).

13. A stable dispersion of melamine in polyol comprising a) compounds containing at least two reactive hydrogen atoms and having a number average molecular weight of from 2200 to 8000, b) melamine, and c) an anionic dispersant, said dispersant comprising a (diphenyl oxide)-disulfonate containing a linear or branched $C_{6-C16}$ alkyl group and an octylphenol ethyl sulfate or an alkali metal salt of said octylphenol ethyl sulfate.

14. A stable dispersion as recited in claim 13, further comprising at least one organic carboxylic acid and/or alkyl ester thereof.

15. A stable dispersion as recited in claim 13, wherein the anionic dispersant is present in an amount of from 0.1 to 2 percent by weight, based on the total weight of the dispersion.

16. A stable dispersion as recited in claim 13, wherein the anionic dispersant is present in an amount of from 0.5 to 2 percent by weight, based on the total weight of the dispersion.

17. A stable dispersion as recited in claim 14, wherein the acid is a dibasic or tribasic acid.

18. A stable dispersion as recited in claim 14, wherein the acid is selected from the group consisting of malonic acid, oxalic acid and lactic acid.

19. A stable dispersion as recited in claim 14, wherein the organic acid and/or ester thereof is present in an amount of from 0.001 to 0.1 percent by weight, based on the total weight of the dispersion.

20. A stable dispersion as recited in claim 14, wherein the organic acid and/or ester thereof is present in an amount of from 0.03 to 0.07 percent by weight, based on the total weight of the dispersion.

21. A stable dispersion as recited in claim 13, wherein melamine is present in an amount of from 5 to 50 percent by weight, based on the component a).

22. A stable dispersion of melamine in polyol comprising a) compounds containing at least two reactive hydrogen atoms and having a number average molecular weight of from 2200 to 8000, b) melamine, c) an anionic dispersant having a sulfonate or sulfate group, and d) an organic carboxylic acid and/or alkyl ester thereof.

23. A stable dispersion as recited in claim 22, wherein the anionic dispersant is present in an amount of from 0.1 to 2 percent by weight, based on the total weight of the dispersion.

24. A stable dispersion as recited in claim 22, wherein the anionic dispersant is present in an amount of from 0.5 to 2 percent by weight, based on the total weight of the dispersion.

25. A stable dispersion as recited in claim 22, wherein the acid is a dibasic or tribasic acid.

26. A stable dispersion as recited in claim 22, wherein the acid is selected from the group consisting of malonic acid, oxalic acid and lactic acid.

27. A stable dispersion as recited in claim 22, wherein the organic acid and/or ester thereof is present in an amount of from 0.001 to 0.1 percent by weight, based on the total weight of the dispersion.

28. A stable dispersion as recited in claim 22, wherein the organic acid and/or ester thereof is present in an amount of from 0.03 to 0.07 percent by weight, based on the total weight of the dispersion.

29. A stable dispersion as recited in claim 22, wherein melamine is present in an amount of from 5 to 50 percent by weight, based on the component a).

* * * * *